United States Patent
Miller

(10) Patent No.: US 6,843,340 B2
(45) Date of Patent: Jan. 18, 2005

(54) HYDRAULIC APPARATUS FOR VEHICLES

(75) Inventor: Christopher Scott Miller, Hamilton, OH (US)

(73) Assignee: Finn Corporation, Fairfield, OH (US)

( * ) Notice: Subject to any disclaimer, the term of this patent is extended or adjusted under 35 U.S.C. 154(b) by 151 days.

(21) Appl. No.: 10/193,011

(22) Filed: Jul. 11, 2002

(65) Prior Publication Data

US 2003/0015367 A1 Jan. 23, 2003

Related U.S. Application Data

(60) Provisional application No. 60/306,987, filed on Jul. 20, 2001.

(51) Int. Cl.[7] .............................. B60K 3/00; B60K 17/14
(52) U.S. Cl. ....................... 180/308; 180/305; 180/306; 180/307
(58) Field of Search ................................ 180/308, 305, 180/306, 307, 6.48, 233, 242

(56) References Cited

U.S. PATENT DOCUMENTS

| | | | |
|---|---|---|---|
| 3,279,637 A | 10/1966 | Olson et al. | |
| 3,388,821 A | 6/1968 | White, Jr. | |
| 3,635,365 A | 1/1972 | Bauer | |
| 3,866,700 A | 2/1975 | Bauer | |
| 4,030,560 A | 6/1977 | Parquet et al. | |
| 4,074,782 A | 2/1978 | Bauer | |
| 4,570,741 A * | 2/1986 | McCoy ....................... 180/242 |
| 4,949,805 A | 8/1990 | Mather et al. | |
| 5,590,731 A | 1/1997 | Jacobson | |
| 5,711,391 A | 1/1998 | Brandt et al. | |
| 5,848,664 A * | 12/1998 | Kaspar ....................... 180/308 |
| 5,894,899 A * | 4/1999 | Ashcroft et al. ........... 180/6.48 |
| 6,098,738 A * | 8/2000 | White .......................... 180/308 |
| 6,135,231 A * | 10/2000 | Reed ........................... 180/308 |
| 6,230,829 B1 * | 5/2001 | Martin et al. ................. 180/6.3 |
| 6,408,972 B1 * | 6/2002 | Rodgers et al. ............. 180/197 |
| 6,634,445 B2 * | 10/2003 | Dix et al. ................... 180/6.48 |
| 2003/0111288 A1 * | 6/2003 | Pellenc ........................ 180/308 |

FOREIGN PATENT DOCUMENTS

JP          3136976       *  3/1991

* cited by examiner

*Primary Examiner*—Christopher P. Ellis
*Assistant Examiner*—J. Allen Shriver
(74) *Attorney, Agent, or Firm*—Dinsmore & Shohl LLP

(57) ABSTRACT

Hydraulic apparatus are provided with a right side drive including a first right side hydraulic motor operable to drive a first wheel and a second right side hydraulic motor operable to drive a second wheel. The first right side hydraulic motor is hydraulically connected in series with the second right side hydraulic motor. In addition, a left side drive is hydraulically connected in parallel with the right side drive. The left side drive includes a first left side hydraulic motor operable to drive a third wheel and a second left side hydraulic motor operable to drive a fourth wheel. The first left side hydraulic motor is hydraulically connected in series with the second left side hydraulic motor. A hydraulic pump is also in fluid communication with the right side drive and the left side drive.

17 Claims, 4 Drawing Sheets

HYDRAULIC APPARATUS FOR VEHICLES

This application claims the benefit of Provisional Application No. 60/306,987 filed Jul. 20, 2001.

TECHNICAL FIELD

This invention relates generally to a hydraulic apparatus for vehicles, and more particularly to a four wheel drive hydraulic apparatus with a right side drive hydraulically connected in parallel with a left side drive.

BACKGROUND OF THE INVENTION

It is well known to provide a vehicle with a four wheel drive apparatus to permit power transfer from all four wheels of the vehicle to the support surface at each wheel location. For example, all-terrain vehicles, pick-up trucks and the like may have a four wheel drive option to thereby maximize traction with the surrounding support surface.

Certain utility vehicles are also known to transmit power at each wheel location. Utility vehicles may include utility attachments that are useful for handling and/or moving various bulk materials, particulate, or the like. For instance, a utility vehicle, such as a fork lift, may be provided with a fork attachment to move bulk material stored in boxes. In another example, a utility vehicle with a shovel attachment may be used to transport particulate, such as soil, from one location to another. A conventional skid loader has various optional utility attachments for performing these various functions. Depending on the function desired, a fork, shovel, basket, or other utility attachment can be removably connected to an adapter plate attached to the lift arms of a utility vehicle.

Utility vehicles, such as a skid loader, are also known to incorporate a hydraulic system for powering the drive system, utility attachments and various other components of the vehicle. One conventional hydraulic apparatus 10 is illustrated in FIG. 1. The hydraulic apparatus 10 uses a pump 12, such as a fixed displacement hydraulic gear pump, to power the various components of the system. A fixed displacement pump will provide a constant hydraulic fluid flow rate determined by the rotational speed of the motor driving the pump 12.

As illustrated in FIG. 1, a valve bank 14 includes a first valve section 22 for controlling hydraulic fluid flow to a right side drive 34. The valve bank 14 further includes a second valve section 24 for controlling hydraulic fluid flow to a left side drive 36. The right side drive 34 includes a single drive motor 38 connected to a front right wheel of a vehicle and operable to drive the front right wheel. Similarly, the left side drive 36 includes a single drive motor 40 connected to a front left wheel of a vehicle and operable to drive the front left wheel.

Typically, each of the right and left side drives includes a chain to mechanically couple the front wheel to the rear wheel of the corresponding sides such that the front and rear right side wheel rotate at approximately equal angular velocities while the front and rear left side wheels also rotate at approximately equal angular velocities. Placing the right and left side drives in parallel in the hydraulic circuit provides the advantage of allowing an even distribution of work between the sides and permits the left and right sides to work independently and therefore operate efficiently despite differences in work load requirements between the sides.

However, the use of a chain for a drive link between the front and rear wheels may be undesirable in certain applications. Installation can be difficult and might require increased assembly time as chain tensioners and other tools must be used to optimize the installation of the mechanical mechanism. In addition, excessive maintenance costs can be experienced with a chain drive system as cleaning is typically required to remove foreign debris deposited on the chain that would otherwise cause undue wear and/or increase the power requirements to overcome excessive friction forces. The chain is also typically mounted to the front axle between the front motor and the front wheel, requiring the wheel to be offset a significant distance from the motor. This significant offset distance increases the bending moment resultant force within the bearing assembly of the motor, further increasing stresses and thereby decreasing the life of the motor. The increased space requirements to accommodate the chain drive mechanism further limit the lateral space available for the hydraulic fluid reservoir. Accordingly, the fluid reservoir might require an increased height, thereby undesirably raising the vehicle's center of gravity. Chain drives also frequently cause the vehicle to lurch forward when traversing a support surface and can result in jarring movements as the vehicle turns to navigate around obstacles. Jarring and lurching can occur as the chain transmits torque from the front wheel to the rear wheel due to tolerances and tension in sections of the drive chain. However, smooth precise movement is desirable and is often required for various applications such as when handling certain materials.

SUMMARY OF THE INVENTION

Accordingly, it is an object of the present invention to obviate problems and shortcomings of conventional vehicle hydraulic systems. More particularly, it is an object of the present invention to provide a vehicle with an improved hydraulic apparatus.

To achieve the foregoing and other objects, a hydraulic apparatus for a vehicle is provided in one embodiment of the present invention. The hydraulic apparatus comprises a right side drive including a first right side hydraulic motor operable to drive a first wheel and a second right side hydraulic motor operable to drive a second wheel. The first right side hydraulic motor is hydraulically connected in series with the second right side hydraulic motor. The hydraulic apparatus further includes a left side drive hydraulically connected in parallel with the right side drive. The left side drive includes a first left side hydraulic motor operable to drive a third wheel and a second left side hydraulic motor operable to drive a fourth wheel. The first left side hydraulic motor is hydraulically connected in series with the second left side hydraulic motor. The hydraulic apparatus also comprises a hydraulic pump in fluid communication with the right side drive and the left side drive.

In another embodiment of the present invention, a hydraulic drive system is provided comprising a right side drive including a first right side hydraulic motor connected to a first wheel and operable to drive the first wheel and a second right side hydraulic motor connected to a second wheel and operable to drive the second wheel. The first right side hydraulic motor is hydraulically connected in series with the second right side hydraulic motor. The hydraulic drive system further includes a left side drive hydraulically connected in parallel with the right side drive. The left side drive includes a first left side hydraulic motor connected to a third wheel and operable to drive the third wheel and a second left side hydraulic motor connected to a fourth wheel and operable to drive the fourth wheel. The first left side hydraulic motor is hydraulically connected in series with the second left side hydraulic motor. The hydraulic drive system also includes a hydraulic pump in fluid communication with the right side drive and the left side drive.

The hydraulic apparatus and hydraulic drive system according to the invention are advantageous in providing improved four wheel drive capabilities. Still other objects and advantages of the present invention will become apparent to those skilled in the art from the following description wherein there are shown and described alternative exemplary embodiments of this invention. As will be realized, the invention is capable of other different, obvious aspects and embodiments, all without departing from the invention. Accordingly, the drawings and descriptions should be regarded as illustrative in nature and not as restrictive.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION

Figure 1:
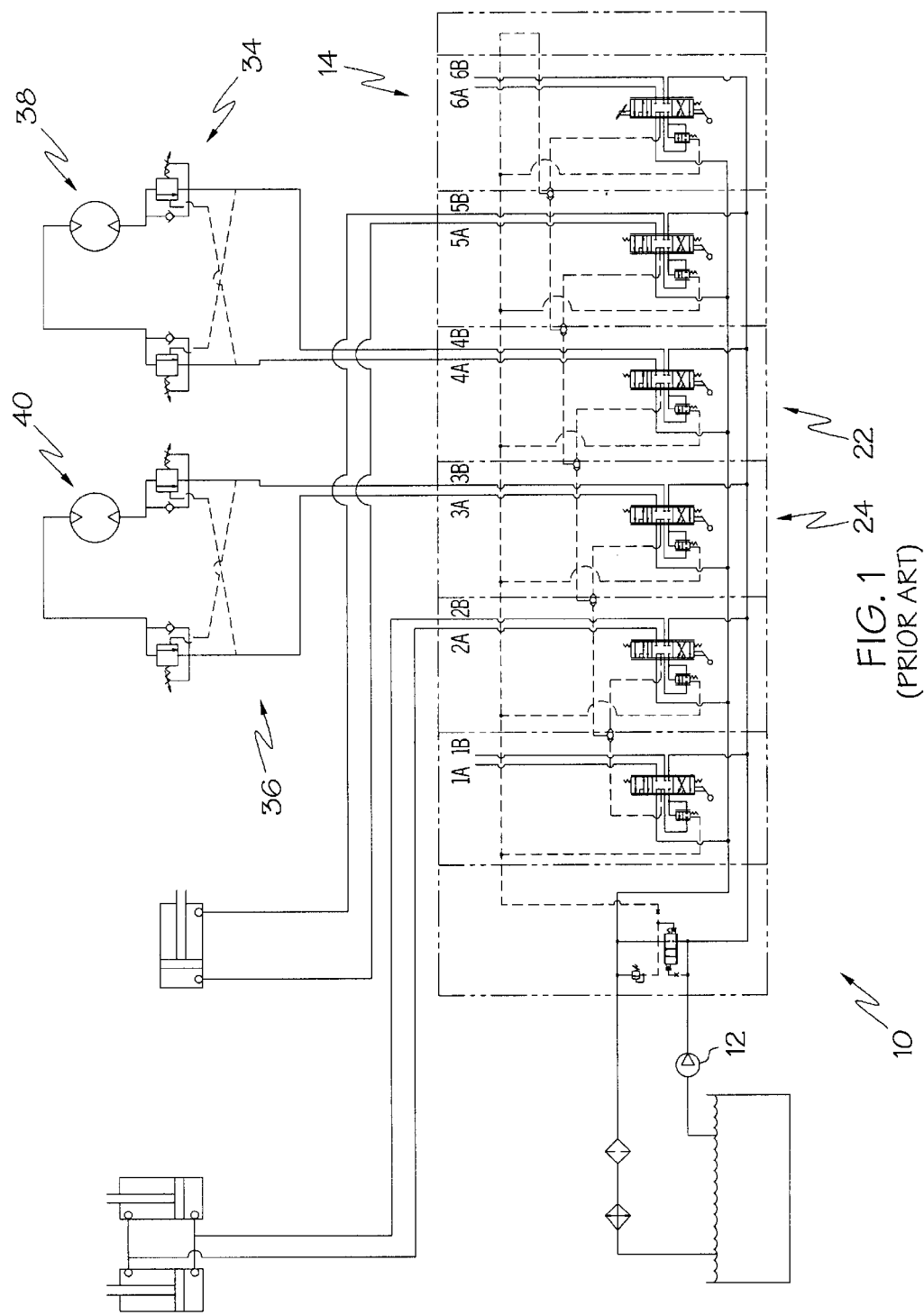
FIG. 1 is a schematic illustration of a conventional hydraulic apparatus for a vehicle.

Turning now to the drawings in detail, wherein like numbers indicate the same or corresponding elements throughout the views, FIG. 1 depicts a conventional hydraulic apparatus 10 that includes a right side drive 34 hydraulically connected in parallel with a left side drive 36, wherein each side drive has a front wheel linked with a chain to a corresponding rear wheel.

Figure 2:
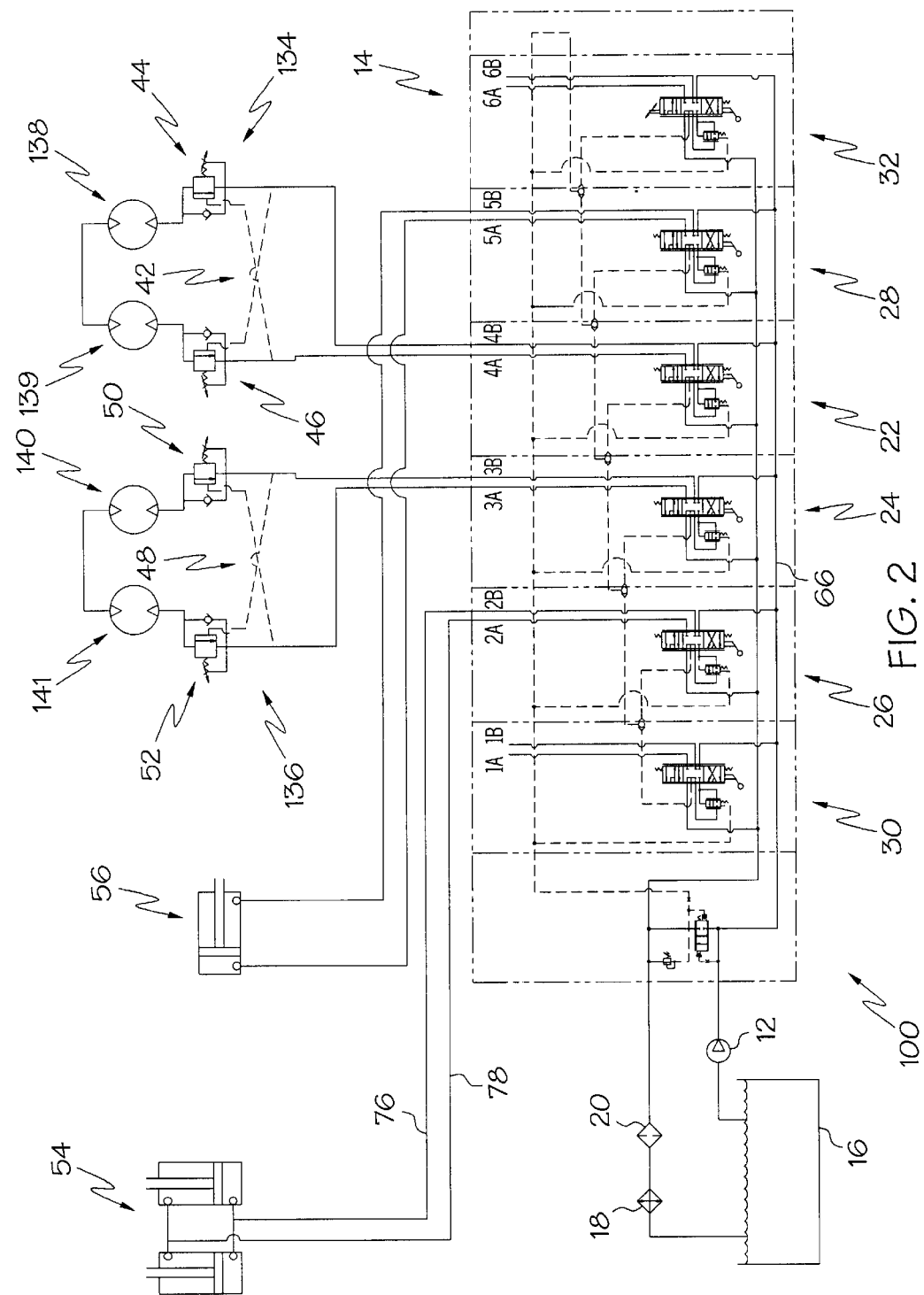
FIG. 2 is a schematic illustration of a hydraulic apparatus in accordance with one exemplary embodiment of the present invention.
Figure 3:
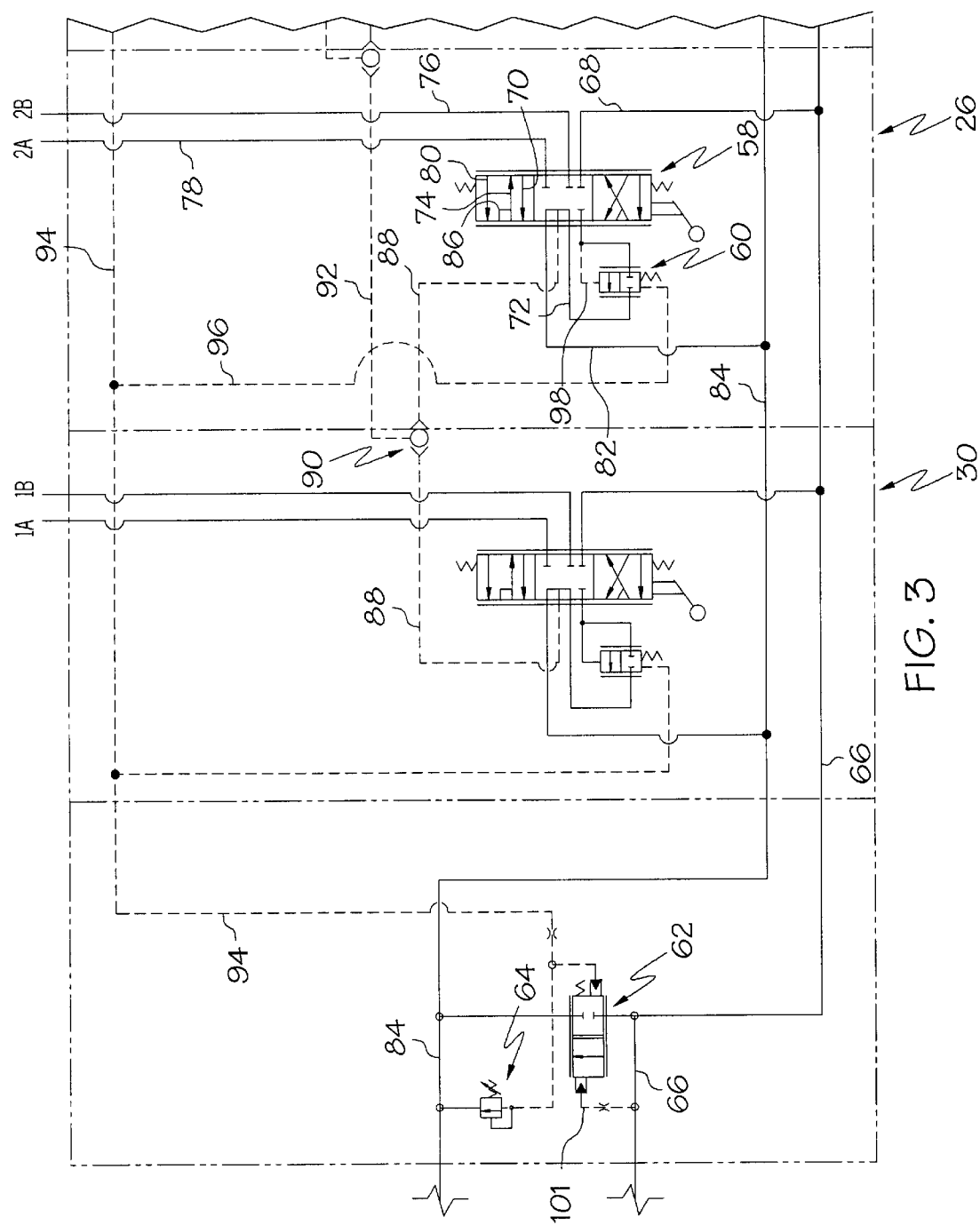
FIG. 3 is a detailed schematic illustration of portions of a valve bank for use in the hydraulic apparatus of the present invention.
Figure 4:
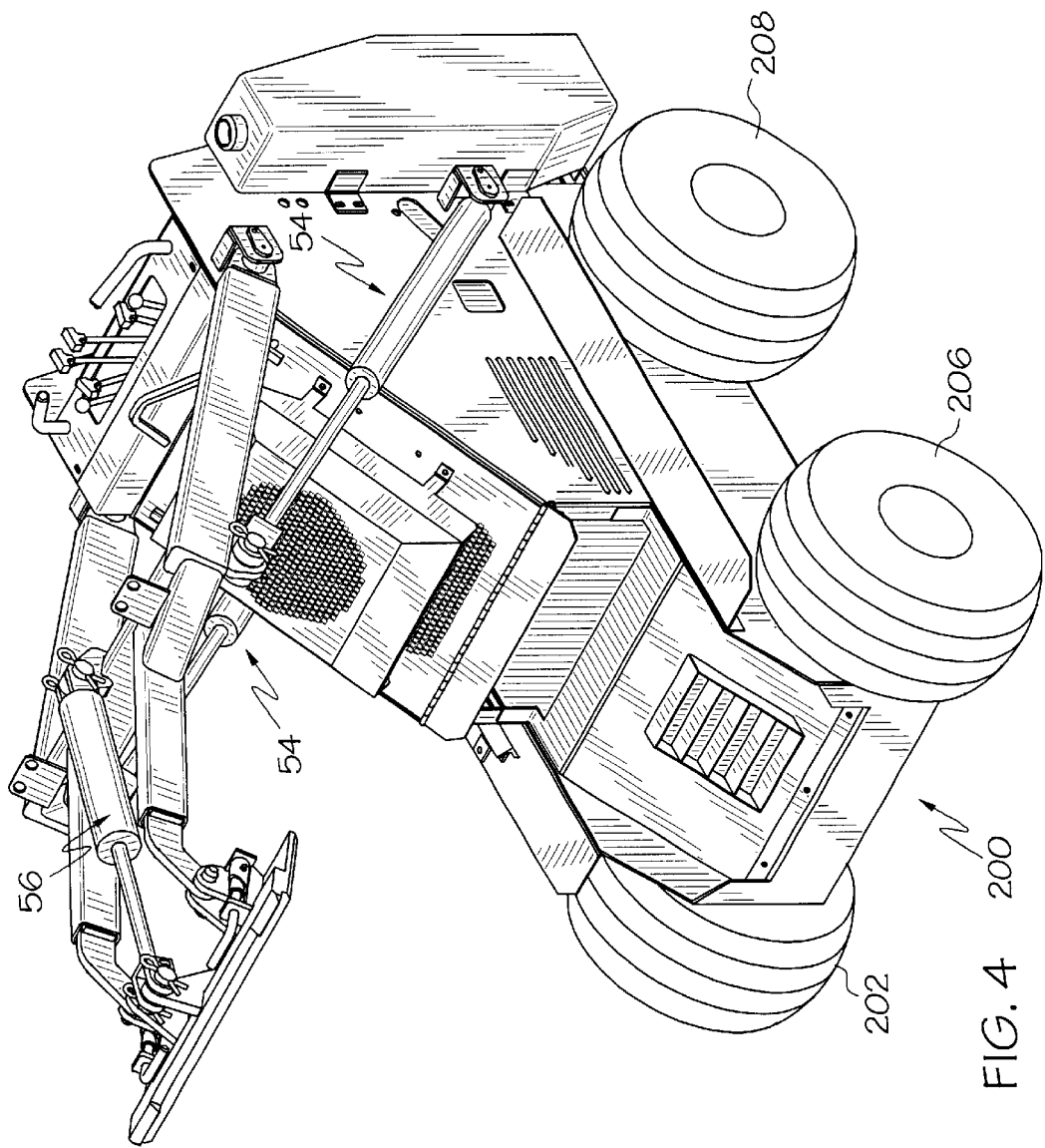
FIG. 4 is a perspective view of an exemplary vehicle incorporating the hydraulic apparatus of FIGS. 2 and 3 therein.

FIGS. 2 and 3 depict an exemplary embodiment of a hydraulic apparatus 100 in accordance with the present invention that can be used in a wide variety of vehicles. For example, the hydraulic apparatus 100 depicted in FIGS. 2 and 3 could be incorporated in a utility vehicle as illustrated in FIG. 4. It will be appreciated that the hydraulic apparatus could also be use in other four wheel drive vehicles for other applications including recreation, transportation, simple traversing of an object with respect to a support surface or the like and is not necessarily required to be used with a utility vehicle with utility attachments as depicted in FIG. 4.

The hydraulic apparatus 100 in accordance with one exemplary embodiment of the present invention includes a right side drive 134 and a left side drive 136. The hydraulic apparatus 100 may include a hydraulic fluid control mechanism, such as the valve bank 14 describe herein and depicted in FIGS. 2 and 3. The particular valve bank 14 is readily available in the prior art for use with the inventive concepts of the present invention. It is understood that hydraulic fluid control mechanisms other than the valve bank 14 can alternatively be used with the concepts of the present invention.

In one exemplary embodiment, the valve bank 14 includes valve sections 22, 24, 26, 28, 30, 32 that are hydraulically connected in parallel to control hydraulic fluid flow from the hydraulic pump 12 to the various system components. For example, the right side drive 134 can be controlled with a first valve section 22 and the left side drive 136 can be controlled with a second valve section 24. Work ports (1A, 1B–6A, 6B) can also be associated with each valve section and can take the form of a coupling device to attach the corresponding valve sections to the work passages of the components. Fluid flow not required by the valve sections is recycled back to a hydraulic fluid reservoir 16. As known in the art, a conventional heat exchanger 18 and/or fluid filter 20 can also be provided to re-condition the hydraulic fluid prior to its return to the fluid reservoir 16.

As illustrated in FIG. 2, the right side drive 134 is hydraulically connected in parallel with the left side drive 136. The right side drive 134 includes a first right side hydraulic motor 138 hydraulically connected in series with a second right side hydraulic motor 139. The first right side hydraulic motor 138 can be connected to a first wheel and operable to drive the first wheel while the second right side hydraulic motor 139 can be connected to a second wheel and operable to drive the second wheel. For example, the first right side hydraulic motor 138 can be connected to a front right wheel 202 of a vehicle 200 (see FIG. 4) while the second right side hydraulic motor 139 can be connected to a rear right wheel (not shown) of the vehicle 200.

The left side drive 136 includes a first left side hydraulic motor 140 hydraulically connected in series with a second left side hydraulic motor 141. The first left side hydraulic motor 140 can be connected to a third wheel and operable to drive the third wheel while the second left side hydraulic motor 141 can be connected to a fourth wheel and operable to drive the fourth wheel. For example, the first left side hydraulic motor 140 can be connected to a front left wheel 206 of the vehicle 200 while the second left side hydraulic motor 141 can be connected to a rear left wheel 208 of the vehicle 200.

As further illustrated in FIG. 2, the right side drive 134 can be provided with a speed regulating apparatus 42 to prevent the vehicle from exceeding its desired velocity, for example by preventing acceleration due to gravity. A known speed regulating setup includes a speed regulating apparatus 42 comprising first and second load holding valves 44, 46. A conventional speed regulating apparatus can be used with the concepts of the present invention by placing one or more motors from at least one of the left and right side drives between the two load holding valves. For example, as illustrated in FIG. 2, the first and second right side hydraulic motors 138, 139 can be located between the first load holding valve 44 and the second load holding valve 46 to regulate the speed of the vehicle in the forward and reverse directions. With the speed regulating apparatus 42 in place, the vehicle 200 will not exceed a predetermined maximum speed, for example, when traversing down an inclined support surface.

FIG. 2 similarly illustrates the left side drive 136 with a speed regulating apparatus 48 that may comprise a first load holding valve 50 and a second load holding valve 52. The speed regulating apparatus 48 operates in the same manner as the speed regulating apparatus 42 described above in relation to the right side drive 134.

The valve bank 14 can also include a third valve section 26 adapted to control fluid flow between the pump 12 and at least one hydraulic cylinder 54 positioned to assist in movement of a utility attachment. For example, the concepts of the present invention can be used with a conventional hydraulic cylinder 54 arranged to assist in vertical movement of the lifting arms of the utility vehicle to vertically lift the front forks, shovel, or other utility attachment of the utility vehicle.

The valve bank 14 can also include a fourth valve section 28 adapted to control fluid flow between the pump 12 and at least a second hydraulic cylinder 56 positioned to assist in independent movement of one or more portions of a utility attachment. For example, a conventional hydraulic cylinder 56 arranged to assist in pivoting a shovel about a horizontal axis to dump particulate at a desired location can also be used with the concepts of the present invention.

It will be understood that the valve bank 14 can also be provided with any number of additional valve sections for other optional attachments or devices. For example, the valve bank 14 could include a fifth valve section 30 adapted to control fluid flow between the pump 12 and at least another hydraulic cylinder controlling an auxiliary attachment or movement. In one example, a hydraulic cylinder could be provided to angle a shovel blade (e.g., by pivoting the shovel blade about a vertical axis). In still another example, the valve bank 14 could include a sixth valve section 32 adapted to connect to an auxiliary motor. For example, the sixth valve section 32 could power an auger or other motorized device to provide the utility vehicle with additional functionality.

As illustrated in FIGS. 2 and 3, the six valve sections 22, 24, 26, 28, 30, and 32 of the valve bank 14 are similar in design. It will be understood that each valve section can have a different fluid flow rating that will determine flow proportionality between the various valve sections. It is known to provide the first valve section 22 (i.e., controlling the right side drive) and the second valve section 24 (i.e., controlling the left side drive) with equal flow proportionalities to synchronize the left and right side drives during normal operation. For example, in one embodiment of the valve bank 14, depicted in FIG. 2, the first and second valve sections 22, 24 are each rated, at 7.5 gallons per minute ("GPM"), the third valve section 26 is rated at 5 GPM, the fourth and fifth valve sections 28, 30 are rated at 2.5 GPM and the sixth valve section 32 is rated at full flow. Accordingly, if the sixth valve section 32 is activated, a substantial portion of fluid flow will pass through the sixth valve section since it has a full flow rating. It will be understood, however, that there will always be fluid flow to the other sections that are opened in proportion to their flow rating and relative spool position. If the sixth valve section 32 is closed, the fluid flow will be proportionally distributed to the remaining valves in accordance with its flow rating. For example, in the described embodiment, the fourth section has twice the rating as the fifth section and will therefore proportionally receive twice the fluid flow when both the valves are opened.

The third valve section 26, will now be described in detail with reference to FIG. 3 that illustrates enlarged portions of the valve bank 14. It is understood that the remaining five valve sections operate in a similar manner. Each valve section includes a spool 58 for controlling the hydraulic fluid flow rate and direction. Each of the spools 58 of the corresponding five valve sections 22, 24, 26, 28, and 30 are spring-biased to the center, or off position. In contrast, the spool 58 of the sixth valve section 32 can be moved to a particular position and released without the spool biasing back to the off position. This allows for continuous operation of the auxiliary motor associated with the sixth valve section 32 while freeing the operators hands to control the other valve sections. The third valve section 26 further includes a pressure compensator 60 designed to proportion the fluid flow to the hydraulic cylinder 54 depending on the fluid flow requirements of the remaining valve sections of the valve bank 14. The valve bank 14 further includes an inlet unloader 62 that splits the hydraulic flow such that some or all of the fluid flow is directed to the various valve sections while any remaining fluid flow is passed back to the hydraulic fluid reservoir 16 depending on the fluid demand by the various valve sections. In addition, a pressure relief valve 64 can be provided as a safety device to dump fluid to the hydraulic fluid reservoir 16 if necessary to prevent excessive buildup of pressure within the system.

In operation, the hydraulic pump 12 directs fluid through a high pressure line 66 of the valve bank 14 to the high pressure lines 68 of the various valve sections. FIG. 2 illustrates the spool 58 of the third valve section 26 in the off position. If the spool valve is shifted downward, fluid will be permitted to pass from the high pressure line 68 to the first passage 70 of the spool 58, through the pressure compensation path 72, through second passage 74, through the work passage 76, and thereafter to the hydraulic cylinder 54. Fluid then travels from the hydraulic cylinder 54, through work passage 78, through the third passage 80 of the spool 58, through the low pressure line 82 of the third valve section 26, and out the low pressure line 84 of the valve bank 14. The fluid may then pass through filter 20 and heat exchanger 18 prior to flowing back into the hydraulic fluid reservoir 16. The hydraulic cylinder 54 can also operate in reverse by simply shifting the spool 58 in the opposite direction.

The spool 58 also includes a load sensing path 86 that provides fluid communication between the second passage 74 and a sensing output passage 88. A load sensing shuttle 90 transmits the highest fluid pressure from the sensing output passages 88 of the third valve section 26 and adjacent fifth valve section 30 to sensing output passage 92 which will in turn be compared with the pressure of the sensing output passage from the adjacent second valve section 24. The highest fluid pressure from the sensing output passages is eventually transmitted through the sensing passage 94 to communicate with the inlet unloader 62. The sensing passage 94 is also in communication with the sensing passages 96 of each of the valve sections to communicate with the corresponding pressure compensators 60. As further illustrated in FIG. 3, a sensing passage 98 also provides fluid communication between the pressure compensation path 72 and the pressure compensator 60. In response to the pressure differential between the pressures in the sensing passage 98 and the sensing passage 96, the pressure compensator 60 adjusts the fluid flow through the pressure compensation path 72 depending on the requirements of the remaining valve sections of the valve bank 14. As discussed above, the pressure in the sensing passage 94 is also communicated to the inlet unloader 62 as illustrated in FIG. 3. An additional sensing passage 101 also provides pressure communication of the high pressure line 66 to the inlet unloader 62. Accordingly, the inlet unloader 62 monitors the pressure differential between the high pressure line 66 and the sensing passage 94 to adjust the amount of fluid flow passed to the various valve sections of the valve bank 14. Any remaining fluid flow is redistributed back to the hydraulic fluid reservoir 16.

The valve bank 14 is advantageous for providing hydraulic fluid control in the apparatus and systems of the invention. However, other hydraulic fluid control mechanisms suitable for use in the invention are available in the art and may be employed herein.

The hydraulic apparatus of the invention exhibits improvements as compared with conventional hydraulic apparatus, for example, as shown in FIG. 1. The improvements of the present invention include hydraulic apparatus, as shown in FIGS. 2 and 3 for example, that do not require mechanical linkage of any of the wheels with a chain link. Rather, the front and rear motors of the right side drive are hydraulically connected in series. Similarly the front and rear motors of the left side drive are also hydraulically connected in series. Moreover, as described above, the right side drive and left side drive are hydraulically connected in parallel.

The hydraulic drive system presented herein can be used with the vehicle 200 depicted in FIG. 4. The four-motor arrangement of the present invention will permit a smoother ride with more precise movement control that is often desirable to perform delicate maneuvers when handling certain materials. The arrangement of the present invention further allows smooth operation during turning movements. In contrast, chain linking mechanisms often lurch forward momentarily as the chain transmits power from the front wheel to the rear wheel.

Still further advantages are experienced by the even distribution of torque between the front and rear wheels. With the chain drive system, the power is typically generated from the front wheel first, thereafter transferring the torque to the rear wheel with the chain. Thus, if the front wheel of the prior art system loses traction with the support surface, the power must still be generated at the front wheel prior to being transferred to the rear wheel with the chain drive. In contrast, the four-wheel arrangement of the present system provides the power directly where it is needed.

It will be appreciated that removal of the chain requirement with the concepts of the present invention will simplify the system by moving a significant number of mechanical elements to the motor interior, thereby protecting these mechanical elements from debris that would otherwise contaminate the system. Removing the chain also reduces the number of stress points experienced by the motor since the chain linkage will not be transferring forces and bending moments from one wheel to another. Moreover, since the extra space requirements for the chain assembly have been eliminated, the hydraulic fluid tank can have an increased width, thereby lowering the height of the tank and center of gravity of the vehicle. Without the chain, the wheel can also be mounted closer to the motor, thereby reducing the resultant bending moments at the motor bearings.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art. For example, although FIGS. 2–4 illustrate a vehicle with four wheels and corresponding motors, it is understood that the vehicle could be provided with any greater number of wheels. For example, a vehicle could be provided with six wheels wherein each side comprises three wheels with a corresponding motor in accordance with the present invention. Accordingly, this invention is intended to embrace all alternatives, modifications and variations that have been discussed herein, and others that fall within the spirit and broad scope of the claims.

What is claimed is:

1. A hydraulic apparatus for a vehicle comprising:
   a) a right side drive including a first right side hydraulic motor operable to drive a first wheel and a second right side hydraulic motor operable to drive a second wheel, wherein the first right side hydraulic motor is hydraulically connected in series with the second right side hydraulic motor;
   b) a left side drive hydraulically connected in parallel with the right side drive, the left side drive including a first left side hydraulic motor operable to drive a third wheel and a second left side hydraulic motor operable to drive a fourth wheel, wherein the first left side hydraulic motor is hydraulically connected in series with the second left side hydraulic motor;
   c) a hydraulic pump in fluid communication with the right side drive and the left side drive; and
   d) a valve bank comprising a first valve section adapted to control fluid flow between the pump and the right side drive and a second valve section adapted to control fluid flow between the pump and the left side drive, and means for proportioning hydraulic fluid between the first valve section and the second valve section.

2. The hydraulic apparatus of claim 1, wherein the hydraulic pump comprises a fixed displacement pump.

3. The hydraulic apparatus of claim 1, wherein at least one of the right side drive and the left side drive includes a speed regulating apparatus.

4. The hydraulic apparatus of claim 3, wherein the speed regulating apparatus comprises a first load holding valve.

5. The hydraulic apparatus of claim 4, wherein the speed regulating apparatus further comprises a second load holding valve.

6. The hydraulic apparatus of claim 5, wherein the right side drive includes the speed regulating apparatus and at least one of the motors of the right side drive are located between the first load holding valve and the second load holding valve.

7. The hydraulic apparatus of claim 6, wherein the first right side hydraulic motor and the second right side hydraulic motor are both located between the first load holding valve and the second load holding valve.

8. The hydraulic apparatus of claim 1, wherein the valve bank further comprises at least a third valve section adapted to control fluid flow between the pump and at least one hydraulic cylinder.

9. The hydraulic apparatus of claim 8, wherein the valve bank further comprises at least a fourth valve section adapted to control fluid flow between the pump and at least a second hydraulic cylinder.

10. The hydraulic apparatus of claim 1, wherein the means for proportioning hydraulic fluid includes at least one pressure compensator valve.

11. The hydraulic apparatus of claim 10, wherein the means for proportioning hydraulic fluid includes a pressure compensator valve in each valve section.

12. The hydraulic apparatus of claim 1, further comprising an inlet unloader.

13. The hydraulic apparatus of claim 12, wherein each valve section is in communication with the inlet unloader.

14. A hydraulic drive system comprising:
   a) a right side drive including a first right side hydraulic motor connected to a first wheel and operable to drive the first wheel and a second right side hydraulic motor connected to a second wheel and operable to drive the second wheel, wherein the first right side hydraulic motor is hydraulically connected in series with the second right side hydraulic motor;
   b) a left side drive hydraulically connected in parallel with the right side drive, the left side drive including a first left side hydraulic motor connected to a third wheel and operable to drive the third wheel and a second left side hydraulic motor connected to a fourth wheel and operable to drive the fourth wheel, wherein the first left side hydraulic motor is hydraulically connected in series with the second left side hydraulic motor;

c) a hydraulic pump in fluid communication with the right side drive and the left side drive; and d) a valve bank comprising a first valve section adapted to control fluid flow between the pump and the right side drive and a second valve section adapted to control fluid flow between the pump and the left side drive, and means for proportioning hydraulic fluid between the first valve section and the second valve section.

15. The hydraulic drive system of claim 14, wherein the first wheel comprises a front right wheel, the second wheel comprises a rear right wheel, the third wheel comprises a front left wheel and the fourth wheel comprises a rear left wheel.

16. The hydraulic drive system of claim 14, wherein the valve bank further comprises at least a third valve section adapted to control fluid flow between the pump and at least one hydraulic cylinder operable to assist in lifting a load.

17. The hydraulic drive system of claim 16, wherein the valve bank further comprises at least a fourth valve section adapted to control fluid flow between the pump and at least a second hydraulic cylinder operable to assist in dumping a load.

* * * * *